United States Patent
Chang et al.

(10) Patent No.: US 10,525,864 B2
(45) Date of Patent: Jan. 7, 2020

(54) TRANSPORTATION DEVICE AND TRANSPORTATION SYSTEM

(71) Applicant: Acer Incorporated, New Taipei (TW)

(72) Inventors: Wen-Pin Chang, New Taipei (TW);
Wen-Shu Lee, New Taipei (TW);
Pu-De Ciou, New Taipei (TW);
Wei-Chen Lai, New Taipei (TW);
Chun-Hung Wen, New Taipei (TW);
Tsung-Hsun Wu, New Taipei (TW)

(73) Assignee: Acer Incorporated, New Taipei (TW)

( * ) Notice: Subject to any disclaimer, the term of this patent is extended or adjusted under 35 U.S.C. 154(b) by 150 days.

(21) Appl. No.: 15/943,709

(22) Filed: Apr. 3, 2018

(65) Prior Publication Data

US 2019/0106043 A1    Apr. 11, 2019

(30) Foreign Application Priority Data

Oct. 6, 2017   (TW) .............................. 106134533 A

(51) Int. Cl.
*B60P 1/64*    (2006.01)
*B60G 17/016*    (2006.01)
(Continued)

(52) U.S. Cl.
CPC .......... *B60P 1/6409* (2013.01); *B60G 17/016* (2013.01); *B60K 6/00* (2013.01);
(Continued)

(58) Field of Classification Search
CPC .......... B60P 1/6409; B60P 1/025; B60K 6/00; B60G 17/016; F16H 37/065; B60B 33/0036
See application file for complete search history.

(56) References Cited

U.S. PATENT DOCUMENTS 4,397,473 A * 8/1983 Miles ........................ B60G 5/04
280/124.102
4,449,725 A * 5/1984 Robison ................ B60B 33/045
280/78

(Continued)

FOREIGN PATENT DOCUMENTS

| CN | 101850795 | 10/2010 |
|---|---|---|
| CN | 106184469 | 12/2016 |
| TW | 201208964 | 3/2012 |

*Primary Examiner* — Darlene P Condra

(74) *Attorney, Agent, or Firm* — JCIPRNET

(57) ABSTRACT

A transportation device includes a motor, a transmission assembly, a position limiting assembly, two linkage assemblies, and two wheels. The transmission assembly is linked to the motor. The position limiting assembly includes two position limiting board portions disposed in parallel and adjacent to each other. The two linkage assemblies partially extend into a space between the two position limiting board portions and are pivoted to the two position limiting board portions, respectively. The two linkage assemblies are limited by the two position limiting board portions in a first axis. The two wheels are disposed in tandem along a second axis, respectively linked to the transmission assembly, and pivoted to the two linkage assemblies. The two wheels are driven by the motor respectively through the transmission assembly and are limited by the two linkage assemblies in the first axis. A transportation system including the transportation device is also provided.

17 Claims, 5 Drawing Sheets

(51) Int. Cl.
  *B60P 1/02* (2006.01)
  *B60K 6/00* (2006.01)
  *B60B 33/00* (2006.01)
  *F16H 37/06* (2006.01)

(52) U.S. Cl.
  CPC ........... *B60P 1/025* (2013.01); *B60B 33/0036* (2013.01); *F16H 37/065* (2013.01)

(56) References Cited

U.S. PATENT DOCUMENTS

| | | | | |
|---|---|---|---|---|
| 5,482,326 | A * | 1/1996 | Levi | B60G 5/02 180/24.02 |
| 5,655,615 | A * | 8/1997 | Mick | B60G 5/02 180/24.02 |
| 7,857,333 | B2 * | 12/2010 | Contarino | B60G 5/00 280/124.111 |
| 8,262,101 | B2 * | 9/2012 | Madler | B60G 21/023 180/24.11 |
| 2011/0100733 | A1 * | 5/2011 | Lin | B62D 57/022 180/8.3 |
| 2019/0046373 | A1 * | 2/2019 | Coulter | G16H 20/30 |
| 2019/0136945 | A1 * | 5/2019 | Nies | F16H 1/2836 |

* cited by examiner

TRANSPORTATION DEVICE AND TRANSPORTATION SYSTEM

CROSS-REFERENCE TO RELATED APPLICATION

This application claims the priority benefit of Taiwan application serial no. 106134533, filed on Oct. 6, 2017. The entirety of the above-mentioned patent application is hereby incorporated by reference herein and made a part of this specification.

BACKGROUND OF THE INVENTION

1. Field of the Invention

The invention relates to a transportation device and a transportation system. More particularly, the invention relates to a straight-moving transportation device and a transportation system.

2. Description of Related Art

Autonomous carriers catch the spotlight in the current transportation system development. Generally, favorable collimation is crucial to an autonomous carrier when moving. Nevertheless, parallelism of the wheels on the two sides of a vehicle is not easy to be adjusted, and thus, the vehicle may easily deviate from a predetermined path. In addition, the wheels of the autonomous carriers in the market are combined by driving wheels and powerless auxiliary wheels. When an autonomous carrier is running on an uneven road surface, the driving wheels may be unable to touch the ground and thus run idle, or the auxiliary wheels may be stuck in a rut and unable to move.

SUMMARY OF THE INVENTION

The invention provides a transportation device with favorable collimation when running and equipped with wheels all having driving capability.

The invention further provides a transportation system having the above-mentioned transportation device.

A transportation device provided by an embodiment of the invention includes a motor, a transmission assembly, a position limiting assembly, two linkage assemblies, and two wheels. The transmission assembly is linked to the motor. The position limiting assembly includes two position limiting board portions disposed in parallel and adjacent to each other. The linkage assemblies partially extend into a space between the two position limiting board portions and are pivoted to the two position limiting board portions, respectively. The linkage assemblies are limited by the two position limiting board portions in a first axis. The two wheels are disposed in tandem along a second axis. The two wheels are respectively linked to the transmission assembly and pivoted to the two linkage assemblies, the two wheels are respectively driven by the motor through the transmission assembly, and the two wheels are limited by the linkage assemblies in the first axis.

In an embodiment of the invention, the transportation device further includes a cover and two elastic members. The cover is secured to the position limiting assembly. The elastic members respectively disposed between the cover and the two linkage assemblies.

In an embodiment of the invention, each of the linkage assemblies includes a linkage board and an extension base. Each of the linkage boards is parallel to the position limiting board portions and partially extends into the space between the position limiting board portions. The extension base is connected to portions of the linkage boards exposed from by the position limiting board portions, and each of the elastic members is respectively connected to the cover and the corresponding extension base.

In an embodiment of the invention, the transmission assembly includes a gear set and a pulley set. The gear set includes a driving gear connected to the motor and two driven gears engaged with the driving gear. The pulley set includes two first pulleys, two second pulleys, and two belts. The first pulleys are respectively linked to the driven gears, the belts are respectively sleeved on the first pulleys and the two second pulleys, and the two wheels are shafted to the second pulleys.

In an embodiment of the invention, the first pulleys are respectively coaxial to two pivoting portions of the linkage assemblies pivoted to the position limiting board portions.

In an embodiment of the invention, the transportation device further includes two securing members. The securing members respectively secure the linkage assemblies to at least one of the position limiting board portions.

In an embodiment of the invention, the transportation device further includes a bottom board. The bottom board is connected to the position limiting assembly, and the motor is disposed on the bottom board.

In an embodiment of the invention, the first axis is perpendicular to the second axis.

The transportation system provided by an embodiment of the invention includes a bearing base and two above-mentioned transportation devices, and the transportation devices are disposed at two opposite sides of the bearing base.

In an embodiment of the invention, the motors are disposed at a middle area of the bearing base.

To sum up, in the transportation device provided by the embodiments of the invention, the linkage assemblies extend into the space between the two position limiting board portions and thereby are unable to swing as limited by the two position limiting board portions located at the two sides in the first axis. Consequently, the two wheels pivoted to the linkage assemblies do not swing in the first axis. In this way, favorable collimation is maintained when the transportation device moves. In addition, in the transportation device provided by the embodiments of the invention, the two wheels are respectively driven by the motor through the transmission assembly. In other words, all of the wheels have the driving capability and thus are less likely to be unable to move when being stuck in a rut when running on an uneven road surface.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
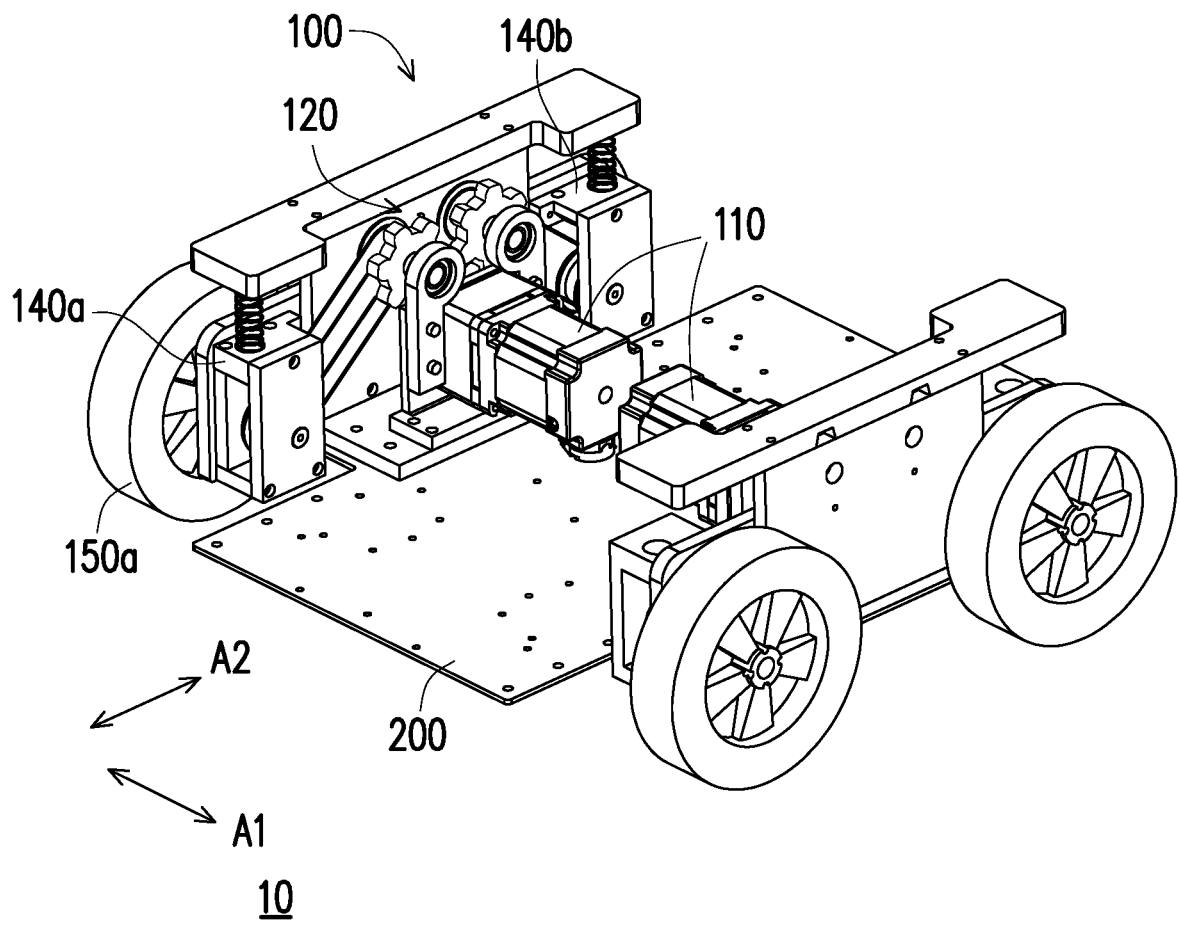
FIG. 1 is a schematic three-dimensional view illustrating a transportation system according to an embodiment of the invention.

FIG. 1 is a schematic three-dimensional view illustrating a transportation system according to an embodiment of the invention. Referring to FIG. 1, a transportation system 10 of this embodiment is, for example, a vehicle body which may be applied to an autonomous carrier. Nevertheless, types of the transportation system 10 are not limited thereto. The transportation system 10 includes two transportation devices 100 and a bearing base 200, wherein the transportation devices 100 are respectively disposed at two opposite sides of the bearing base 200. Two motors 110 of the two transportation devices 100 are disposed at a middle area of the bearing base 200, such that an overall center of gravity is maintained at the middle area. Certainly, a number of the transportation devices 100, and positions of the transportation devices 100 relative to the bearing base 200 are not limited thereto.

Figure 2:
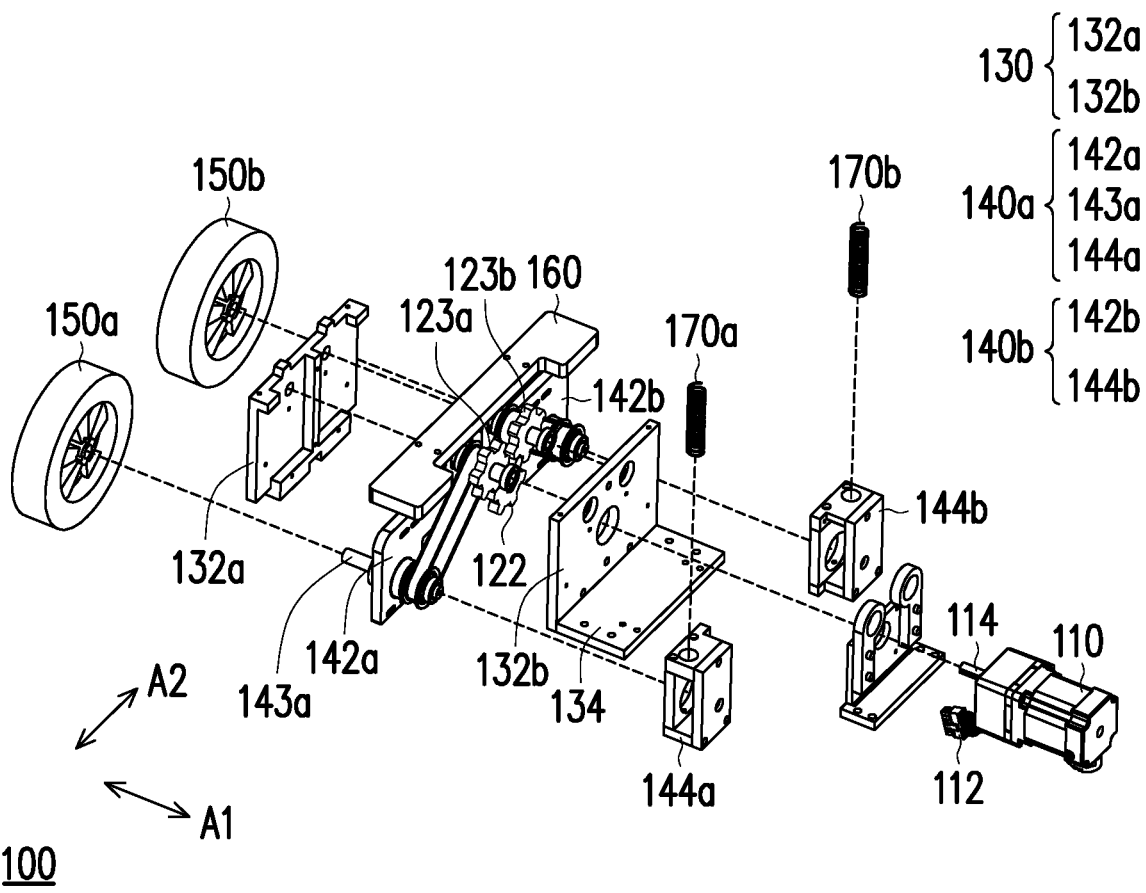
FIG. 2 is a schematic exploded view illustrating the transportation device in FIG. 1.

FIG. 2 is a schematic exploded view illustrating the transportation device in FIG. 1. Referring to FIG. 2, the transportation device 100 of this embodiment includes a motor 110, a transmission assembly 120, a position limiting assembly 130, two linkage assemblies 140a and 140b, and two wheels 150a and 150b. The motor 110 includes an electrical connector 112 and a rotating shaft 114. The electrical connector 112 is configured to supply external power to the motor 110, and the transmission assembly 120 is linked to the rotating shaft 114 of the motor 110. The position limiting assembly 130 includes two position limiting board portions 132a and 132b disposed in parallel and adjacent to each other along a first axis A1. The motor 110 is disposed on a bottom board 134. The two linkage assemblies 140a and 140b partially extend into a space between the two position limiting board portions 132a and 132b and are pivoted to the two position limiting board portions 132a and 132b, respectively. The two wheels 150a and 150b are respectively linked to the transmission assembly 120 and pivoted to the two linkage assemblies 140a and 140b. Moreover, the two wheels 150a and 150b are driven by the motor 110 through the transmission assembly 120.

To be specific, the position limiting assembly 130 may be formed by the two position limiting board portions 132a and 132b separated from and independent of each other, as shown in FIG. 2. The position limiting assembly 130 may also be formed by one single component having opposing internal surfaces just like a concave shape. The invention is not limited thereto. In this embodiment, as the two linkage assemblies 140a and 140b partially extend into the space between the two position limiting board portions 132a and 132b, movements of the two linkage assemblies 140a and 140b in the first axis A1 are thereby limited by the two position limiting board portions 132a and 132b. Therefore, the two linkage assemblies 140a and 140b may only be able to rotate around a shaft pivoted to the two position limiting board portions 132a and 132b. When the transportation system 10 is moved, the two linkage assemblies 140a and 140b do not swing towards each other, and favorable parallelism is thereby maintained.

In another aspect, a second axis A2 may be defined by a center line of the bearing base 200 with respect to the two transportation devices 100 on the left and right sides, wherein the second axis A2 is perpendicular to the first axis A1. Moreover, the second axis A2 is parallel to an upper surface of the bearing base 200. As shown in FIG. 1, the two wheels 150a and 150b in one of the transportation devices 100 on one side are disposed in tandem along the second axis A2. The two wheels 150a and 150b are respectively pivoted to the two linkage assemblies 140a and 140b. The two linkage assemblies 140a and 140b are limited by the two position limiting board portions 132a and 132b in the first axis A1. As such, the two wheels 150a and 150b pivoted to the two linkage assemblies 140a and 140b are consequently limited by the two position limiting board portions 132a and 132b in the first axis A1 through the two linkage assemblies 140a and 140b, and favorable parallelism is thereby maintained. Therefore, when the entire transportation system 10 is moved, fidelity of the two wheels 150a and 150b of each of the transportation devices 100 on two sides may be maintained and favorable collimation is achieved.

Furthermore, the two linkage assemblies 140a and 140b of this embodiment include two linkage boards 142a and 142b and two extension bases 144a and 144b. The linkage boards 142a and 142b are parallel to the two position limiting board portions 132a and 132b and partially extend into the space between the two position limiting board portions 132a and 132b. The two extension bases 144a and 144b are respectively connected to portions of the two linkage boards 142a and 142b exposed from the two position limiting board portions 132a and 132b.

In addition, the transportation device 100 of this embodiment further includes a cover 160 and two elastic members 170a and 170b. The cover 160 is secured to the position limiting assembly 130. The two elastic members 170a and 170b are respectively disposed between the cover 160 and the two linkage assemblies 140a and 140b. After the two linkage assemblies 140a and 140b rotate relative to the cover 160, the two elastic members 170a and 170b are able to provide elasticity which enables the two linkage assemblies 140a and 140b to return to original positions.

Figure 3:
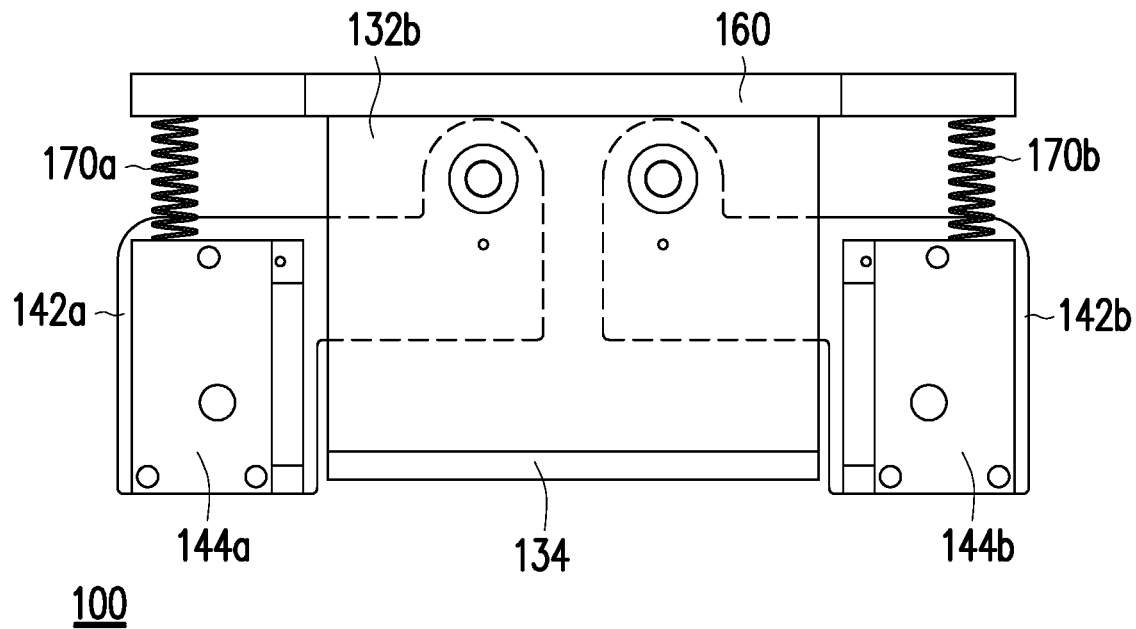
FIG. 3 and FIG. 4 are schematic views respectively illustrating one of the linkage assemblies and one of the elastic members in FIG. 1 before and after being applied by a force from the ground.
Figure 4:
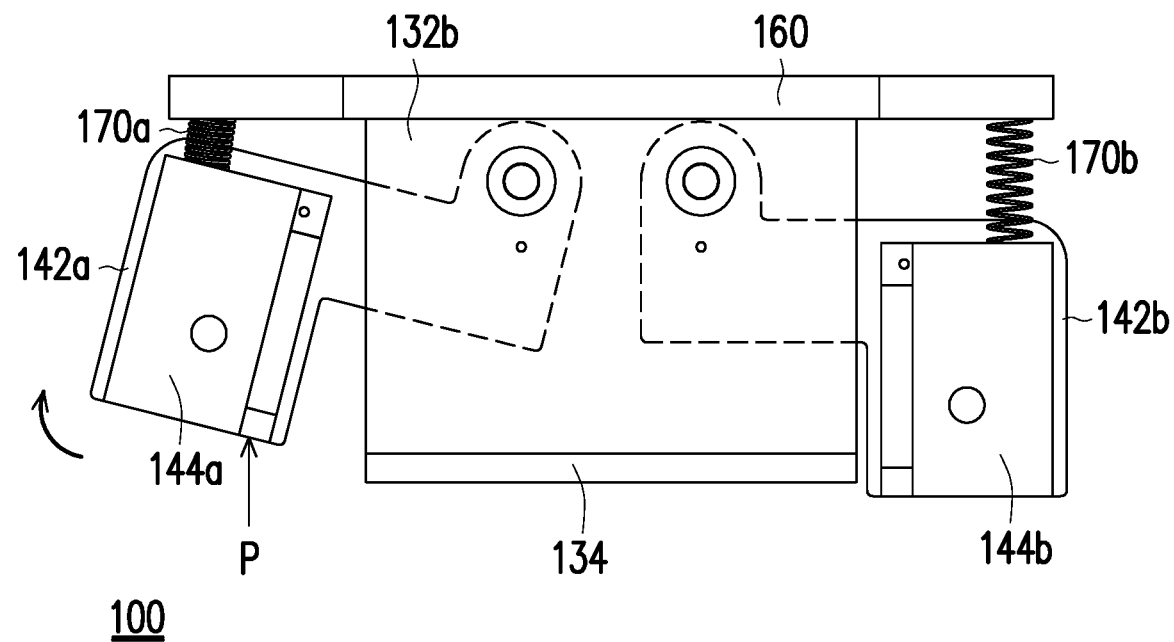

FIG. 3 and FIG. 4 are schematic views respectively illustrating one of the linkage assemblies and one of the elastic members in FIG. 1 before and after being applied by a force from the ground. Note that the motor 110, the transmission assembly 120, and the two wheels 150a and 150b are not shown in FIG. 3 and FIG. 4 in order to simplify the drawings.

Refer to FIG. 3 and FIG. 4, in this embodiment, the two elastic members 170a and 170b are respectively two springs with elasticity and may be compressed or stretched when being applied by a certain force range. Nevertheless, the two elastic members 170a and 170b may also be objects with elasticity, and the invention is not limited thereto. When the transportation system 10 is driving on a bumpy road, the linkage board 142a is applied by a force P from the ground generated from the wheel 150a as affected by ups and downs of the road, and thus the linkage board 142a is forced and moves towards the cover 160. One end of the linkage board 142a is pivoted to the two position limiting board portions 132a and 132b through a connecting shaft, as such, the linkage board 142a may only be rotated around a shaft pivoted to the two position limiting board portions 132a and 132b and is rotated in the clockwise direction (in the direction of the arrows in FIG. 4) as shown in FIG. 4. At the same time, the elastic member 170a begins to be compressed from an original state. When the force P from the ground is eliminated, the elastic member 170a begins to be stretched and restore to a length of the original state. During this process, elasticity generated by the elastic member 170a when being compressed and stretched is served as a shock absorption effect for the transportation device 100.

Figure 5:
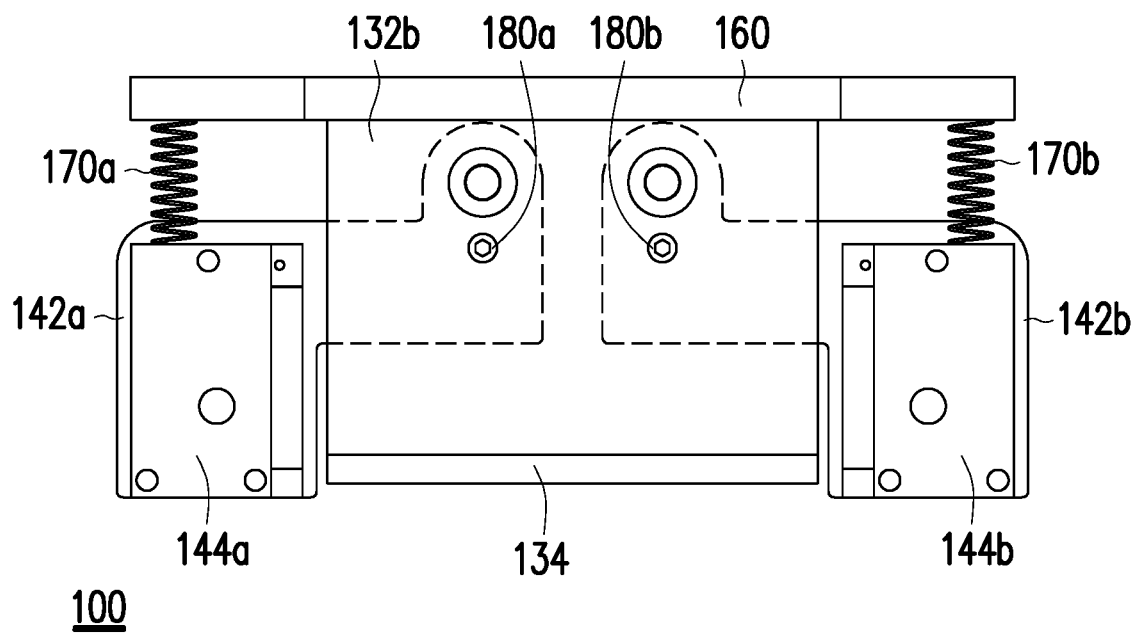
FIG. 5 is a schematic view of securing the two linkage assemblies of the transportation device of FIG. 1 to a position limiting assembly by two securing members.
Figure 6:
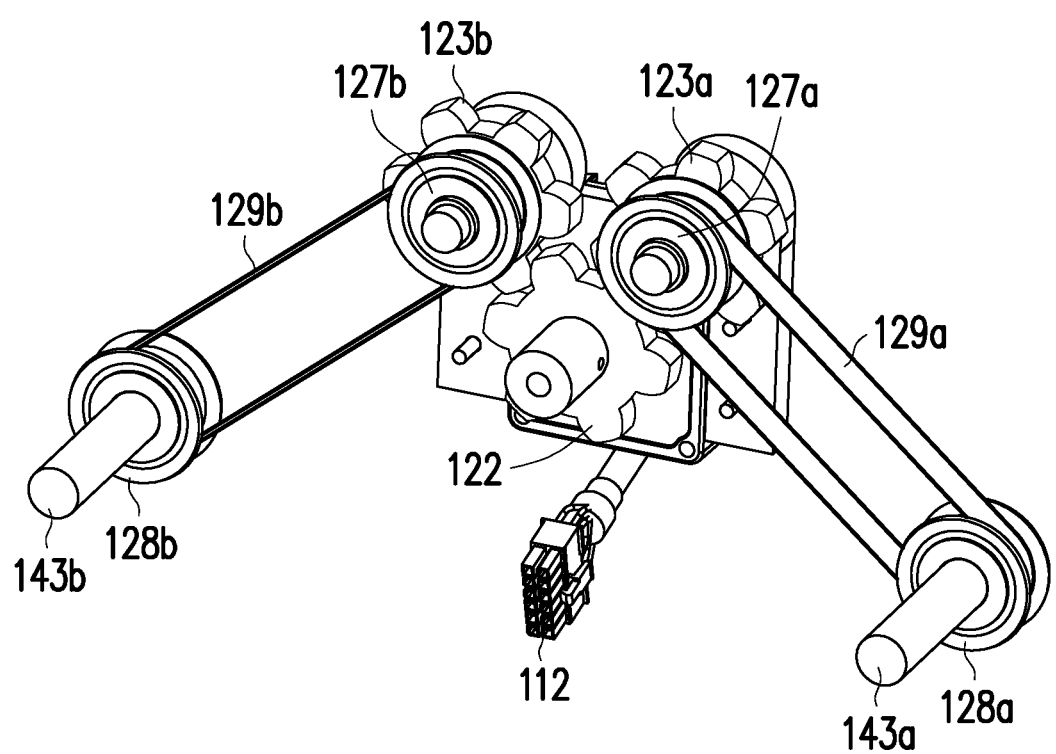
FIG. 6 is a schematic three-dimensional view illustrating the transmission assembly of the transportation system of FIG. 1 from another view angle.

Besides, the transportation device 100 provided by the embodiments of the invention may further include two securing members 180a and 180b. FIG. 5 is a schematic view of securing the two linkage assemblies 140a and 140b to the position limiting assembly 130 by the two securing members 180a and 180b. Referring to FIG. 6, in an embodiment, when shock absorption is not required, the two securing members 180a and 180b may be used to secure the position limiting assembly 130 and the two linkage assemblies 140a and 140b. As such, the two linkage assemblies 140a and 140b do not move relatively to the position limiting assembly 130, a structure and corresponding movement may thus be simplified. In this embodiment, the two securing members 180a and 180b are, for example, screws, but the invention is not limited thereto. The elements capable of providing the function of securing the position limiting assembly 130 and the two linkage assemblies 140a and 140b may fall within the scope of the invention.

FIG. 6 is a schematic three-dimensional view illustrating the transmission assembly of the transportation system of FIG. 1 from another view angle. Referring to FIG. 6, the transmission assembly 120 (shown in FIG. 1) provided by the embodiments of the invention includes a gear set and a pulley set. The gear set includes a driving gear 122 connected to the rotating shaft 114 of the motor 110 and two driven gears 123a and 123b engaged with the driving gear 122. The pulley set includes two first pulleys 127a and 127b, two second pulleys 128a and 128b, and two belts 129a and 129b. The two first pulleys 127a and 127b are respectively linked to the two driven gears 123a and 123b. The two belts 129a and 129b are respectively sleeved on the two first pulleys 127a and 127b and the two second pulleys 128a and 128b. Moreover, the two wheels 150a and 150b are respectively shafted to the two second pulleys 128a and 128b through two pivoting portions 143a and 143b.

In this embodiment, when the motor 110 operates and drives the driving gear 122 to rotate, the two driven gears 123a and 123b engaged with the driving gear 122 and the driving gear 122 are rotated at a same rotation speed, but the two driven gears 123a and 123b are rotated in a direction opposite to that of the driving gear 122. The two first pulleys 127a and 127b coaxial to the two driven gears 123a and 123b are also driven at the same time. The two belts 129a and 129b are respectively sleeved on the two first pulleys 127a and 127b and the two second pulleys 128a and 128b. As such, the two second pulleys 128a and 128b are rotated corresponding to rotation of the two belts 129a and 129b respectively driven by the two first pulleys 127a and 127b and are able to provide a driving force to the two wheels 150a and 150b shafted to the two second pulleys 128a and 128b. The two wheels 150a and 150b are thereby driven to rotate. In other words, the two wheels 150a and 150b are driving wheels in this embodiment. In this way, when the two wheels 150a and 150b run on a rough road surface, the two wheels 150a and 150b are less likely to be stuck in a rut or run idle.

In this embodiment, the two belts 129a and 129b are timing belts, and the two first pulleys 127a and 127b and the two second pulleys 128a and 128b are all timing pulleys. Nevertheless, the two belts 129a and 129b, the two first pulleys 127a and 127b, and the two second pulleys 128a and 128b may also be belts and pulleys of other types, and the invention is not intended to limit the types of the belts and the pulleys.

In view of the foregoing, in the transportation device provided by the embodiments of the invention, the linkage assemblies extend into the space between the two position limiting board portions and thereby are unable to swing as limited by the two position limiting board portions located at the two sides in the first axis. Consequently, the two wheels pivoted to the linkage assemblies do not swing. In this way, favorable collimation is maintained when the transportation device moves. In addition, in the transportation device provided by the embodiments of the invention, the two wheels are respectively driven by the motor through the transmission assembly. In other words, all of the wheels have the driving capability and thus are less likely to be unable to move when being stuck in a rut when running on an uneven road surface. Besides, in the transportation system provided by the embodiments of the invention, the two motors are respectively disposed at the middle area of the bearing base, the center of gravity of the transportation system is thus centralized and stability is thereby enhanced when the transportation system moves.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A transportation device, wherein the transportation device comprises:
   a motor;
   a transmission assembly linked to the motor;
   a position limiting assembly comprising two position limiting board portions disposed in parallel and adjacent to each other;
   two linkage assemblies partially extending into a space between the two position limiting board portions and pivoted to the two position limiting board portions, respectively, the two linkage assemblies being limited by the position limiting board portions in a first axis; and
   two wheels disposed in tandem along a second axis, the two wheels being respectively linked to the transmission assembly and pivoted to the two linkage assemblies, wherein the two wheels are respectively driven by the motor through the transmission assembly, and the two wheels are limited by the two linkage assemblies in the first axis.

2. The transportation device as claimed in claim 1, further comprising:
   a cover secured to the position limiting assembly; and
   two elastic members respectively disposed between the cover and the two linkage assemblies.

3. The transportation device as claimed in claim 2, wherein each of the linkage assemblies comprises a linkage board and an extension base, each of the linkage boards is parallel to the two position limiting board portions and partially extends into the space between the two position limiting board portions, the extension base is connected to portions of the linkage boards exposed from the two position limiting board portions, and each of the elastic members is respectively connected to the cover and the corresponding extension base.

4. The transportation device as claimed in claim 1, wherein the transmission assembly comprises a gear set and a pulley set, the gear set comprises a driving gear connected to the motor and two driven gears engaged with the driving gear, the pulley set comprises two first pulleys, two second pulleys, and two belts, the two first pulleys are respectively linked to the two driven gears, the two belts are respectively sleeved on the two first pulleys and the two second pulleys, and the two wheels are shafted to the two second pulleys.

5. The transportation device as claimed in claim 4, wherein the two first pulleys are respectively coaxial to two pivoting portions of the two linkage assemblies pivoted to the two position limiting board portions.

6. The transportation device as claimed in claim 1, further comprising:
two securing members respectively securing the two linkage assemblies to at least one of the position limiting board portions.

7. The transportation device as claimed in claim 1, further comprising:
a bottom board connected to position limiting assembly, the motor being disposed on the bottom board.

8. The transportation device as claimed in claim 1, wherein the first axis is perpendicular to the second axis.

9. A transportation system, comprising:
a bearing base; and
two transportation devices as claimed in claim 1, the two transportation devices being disposed at two opposite sides of the bearing base.

10. The transportation system as claimed in claim 9, wherein two motors are disposed at a middle area of the bearing base.

11. The transportation system as claimed in claim 9, the transportation device further comprising:
a cover secured to the position limiting assembly; and
two elastic members respectively disposed between the cover and the two linkage assemblies.

12. The transportation system as claimed in claim 11, wherein each of the linkage assemblies comprises a linkage board and an extension base, each of the linkage boards is parallel to the two position limiting board portions and partially extends into the space between the two position limiting board portions, the extension base is connected to portions of the linkage boards exposed from the two position limiting board portions, and each of the elastic members is respectively connected to the cover and the corresponding extension base.

13. The transportation system as claimed in claim 9, wherein the transmission assembly comprises a gear set and a pulley set, the gear set comprises a driving gear connected to the motor and two driven gears engaged with the driving gear, the pulley set comprises two first pulleys, two second pulleys, and two belts, the two first pulleys are respectively linked to the two driven gears, the two belts are respectively sleeved on the two first pulleys and the two second pulleys, and the two wheels are shafted to the two second pulleys.

14. The transportation system as claimed in claim 13, wherein the two first pulleys are respectively coaxial to two pivoting portions of the two linkage assemblies pivoted to the two position limiting board portions.

15. The transportation system as claimed in claim 9, the transportation device further comprising:
two securing members respectively securing the two linkage assemblies to at least one of the position limiting board portions.

16. The transportation system as claimed in claim 9, the transportation device further comprising:
a bottom board connected to the position limiting assembly, the motor being disposed on the bottom board.

17. The transportation system as claimed in claim 9, wherein the first axis is perpendicular to the second axis.

* * * * *